US012683244B2

(12) United States Patent
Zhang et al.

(10) Patent No.: US 12,683,244 B2
(45) Date of Patent: Jul. 14, 2026

(54) ELECTROCHEMICAL DEVICE

(71) Applicant: Amperex Technology Limited, Hong Kong (CN)

(72) Inventors: Yibo Zhang, Hong Kong (CN); Hongmei Wei, Hong Kong (CN); Qiaoshu Hu, Hong Kong (CN); Bin Wang, Hong Kong (CN); Chi Ho Kwok, Hong Kong (CN); Ka I Lee, Hong Kong (CN); Chenmin Liu, Hong Kong (CN)

(73) Assignee: Amperex Technology Limited, Hong Kong (CN)

( * ) Notice: Subject to any disclaimer, the term of this patent is extended or adjusted under 35 U.S.C. 154(b) by 857 days.

(21) Appl. No.: 17/953,673

(22) Filed: Sep. 27, 2022

(65) Prior Publication Data

US 2023/0025798 A1 Jan. 26, 2023

Related U.S. Application Data

(63) Continuation of application No. PCT/CN2020/081829, filed on Mar. 27, 2020.

(51) Int. Cl.
| | |
|---|---|
| *H01M 50/446* | (2021.01) |
| *H01M 10/0525* | (2010.01) |
| *H01M 50/44* | (2021.01) |
| *H01M 50/443* | (2021.01) |
| *H01M 50/46* | (2021.01) |
| *H01M 50/491* | (2021.01) |

(52) U.S. Cl.
CPC ..... *H01M 50/446* (2021.01); *H01M 10/0525* (2013.01); *H01M 50/44* (2021.01); *H01M 50/443* (2021.01); *H01M 50/46* (2021.01); *H01M 50/491* (2021.01)

(58) Field of Classification Search
CPC .. H01M 50/446; H01M 50/44; H01M 50/491; H01M 50/46; H01M 50/443
See application file for complete search history.

(56) References Cited

U.S. PATENT DOCUMENTS

| | | | |
|---|---|---|---|
| 2009/0111026 A1* | 4/2009 | Kim | H01M 50/446 |
| | | | 429/252 |
| 2013/0236766 A1 | 9/2013 | Seo et al. | |

(Continued)

FOREIGN PATENT DOCUMENTS

| | | |
|---|---|---|
| CN | 101399122 A | 4/2009 |
| CN | 102420312 A | 4/2012 |

(Continued)

OTHER PUBLICATIONS

Office Action issued on Dec. 9, 2023, in corresponding Chinese Application No. 202080095917.8, 20 pages.

(Continued)

*Primary Examiner* — Keith Walker
*Assistant Examiner* — Steven S Ha
(74) *Attorney, Agent, or Firm* — Maier & Maier, PLLC

(57) ABSTRACT

An electrochemical device which includes an electrode plate and a porous layer formed on a surface of the electrode plate. The porous layer includes nanofibers and inorganic particles. The nanofibers and the inorganic particles are bonded together by a crosslinker. In addition, an electronic device, which includes this electrochemical device.

18 Claims, 2 Drawing Sheets

(56) References Cited

U.S. PATENT DOCUMENTS

| | | | |
|---|---|---|---|
| 2015/0249243 A1 | 9/2015 | Nagino et al. | |
| 2017/0346063 A1* | 11/2017 | Wong | H01M 50/491 |

FOREIGN PATENT DOCUMENTS

| | | | | |
|---|---|---|---|---|
| CN | 103779527 A | 5/2014 | | |
| CN | 104272501 A | 1/2015 | | |
| CN | 104638296 A | 5/2015 | | |
| CN | 104835931 A | 8/2015 | | |
| CN | 105514355 A | 4/2016 | | |
| CN | 106450101 A | * 2/2017 | D01D 5/30 | |
| CN | 106450253 A | 2/2017 | | |
| CN | 107004808 A | 8/2017 | | |
| CN | 107516721 A | 12/2017 | | |
| CN | 107516723 A | * 12/2017 | H01M 10/0525 | |
| CN | 107516724 A | 12/2017 | | |
| CN | 107516725 A | 12/2017 | | |
| CN | 108842303 A | 11/2018 | | |
| CN | 109802083 A | 5/2019 | | |
| CN | 109935751 A | 6/2019 | | |
| JP | 2008123988 A | 5/2008 | | |
| JP | 201269457 A | 4/2012 | | |
| JP | 2018-147769 A | 9/2018 | | |
| JP | 20204684 A | 1/2020 | | |
| JP | 202035596 A | 3/2020 | | |
| KR | 1020040108525 A | 12/2004 | | |
| WO | WO-03082975 A1 | * 10/2003 | C08F 255/02 | |
| WO | WO-2012133753 A1 | * 10/2012 | H01M 50/489 | |

OTHER PUBLICATIONS

Office Action issued on Oct. 17, 2023, in corresponding Japanese Application No. 2022-558427, 5 pages.

Extended European Search Report issued on Jun. 20, 2023, in corresponding European Application No. 20927126.1, 5 pages.

International Search Report mailed Dec. 28, 2020, corresponding to International Application No. PCT/CN2020/081829; 8 pages (with English Translation).

* cited by examiner

ELECTROCHEMICAL DEVICE

CROSS-REFERENCE TO RELATED APPLICATION

This application is a continuation application of PCT application Serial No PCT/CN2020/081829, filed on Mar. 27, 2020, the content of which is incorporated herein by reference in its entirety.

TECHNICAL FIELD

This application relates to an electrochemical device and an electronic device containing the electrochemical device, and in particular, to a lithium-ion battery and an electronic device containing the lithium-ion battery.

BACKGROUND

Lithium-ion batteries are widely used in the field of consumer electronics by virtue of many advantages such as a high energy density, a long cycle life, a high nominal voltage (higher than 3.7 V), and a low self-discharge rate. In recent years, with rapid development of electric vehicles and portable electronic devices, people are posing higher requirements on the energy density, safety, cycle performance, and the like of the lithium-ion batteries, and are expecting the rollout of a new lithium-ion battery with overall performance enhanced comprehensively. One of eye-catching new technologies is to dispose a fibrous porous layer between a positive electrode and a negative electrode of the lithium-ion battery to replace the conventional ordinary separator.

The fibrous porous layer prepared by spinning on a surface of an electrode plate may be directly integrated into the surface of the electrode plate, thereby saving the step of making a stand-alone separator in the conventional process and simplifying a production process of the lithium ion battery. In addition, the fibrous porous layer prepared by spinning can be made thinner, thereby increasing an energy density of the lithium-ion battery. In addition, the fibrous porous layer prepared by spinning is more porous than the conventional separator, thereby improving electrolyte retainability of the lithium-ion battery. Therefore, the fibrous porous layer prepared by spinning has attracted extensive attention.

Currently, in the fibrous porous layer prepared by spinning, nanoscale or micronscale fibers are bonded together directionally or randomly. The random lap-joint between the fibers forms a large number of pores configured to transport ions. The fibers themselves serve as a framework configured to support the fibrous porous layer. However, mechanical strength of the fibers themselves and a bonding force between the fibers are weak, resulting in insufficient mechanical strength of the fibrous porous layer as a whole. Consequently, local internal short circuits are prone to occur in a case that particles in positive and negative electrodes are penetrated, thereby increasing the self-discharge degree of the lithium-ion battery (for example, leading to an inferior K value), or even causing heat and explosion of the lithium-ion battery and giving rise to safety hazards. Therefore, it is urgent to develop a technology for improving the mechanical strength of the fibrous porous layer and the bonding force between fibers in the fibrous porous layer, so as to improve performance of the lithium-ion battery.

SUMMARY

An objective of this application is to provide an electrochemical device, of which a porous layer possesses high penetration strength.

A first aspect of this application provides an electrochemical device, including an electrode plate and a porous layer formed on a surface of the electrode plate. The porous layer includes nanofibers and inorganic particles. The nanofibers and the inorganic particles are bonded together by a crosslinker.

In some embodiments of the first aspect of this application, an initiator is further included in the porous layer. Based on a total mass of the porous layer, a weight percent of the nanofibers is 4.9 wt % to 95 wt %, a weight percent of the inorganic particles is 4.9 wt % to 95 wt %, a weight percent of the crosslinker plus the initiator is 0.1 wt % to 40 wt %, and a mass of the initiator is 5% to 20% of a total mass of the crosslinker and the initiator.

In some embodiments of the first aspect of this application, a penetration strength P N/20 μm of the porous layer and a percentage M of a mass of the inorganic particles in a total mass of the porous layer satisfy the following relational expression:

$$9 \le \frac{P}{M+1} \le 150.$$

In the formula above, the penetration strength P is measured in units of N/20 μm.

In some embodiments of the first aspect of this application, P≥16.

In some embodiments of the first aspect of this application, P≥20.

In some embodiments of the first aspect of this application, the crosslinker is selected from the group consisting of polyisocyanate, hexamethoxymethylmelamine, N-methylol acrylamide, carbodi-imide, trimethylolpropane, aziridine, dicumyl peroxide, butyl acrylate, N,N'-methylene bisacrylamide, 2,5-dimethyl-2,5-bis(tert-butylperoxide)hexane, bisphenol A epoxy resin, an acrylate derivative, a nitrile-containing polymer, styrene, vinyl fluoride, acrylonitrile, acrylamide, vinyl acetate, alkyl vinyl ether, alkylene oxide, and a trimethylene oxide derivative.

In some embodiments of the first aspect of this application, the initiator is selected from the group consisting of benzoyl peroxide, tert-butyl benzoyl peroxide, methyl ethyl ketone peroxide, azobisisobutyronitrile, azobisisoheptanenitrile, dimethyl azobisisobutyrate, azobisisobutylamidine hydrochloride, boron trifluoride, phosphorus pentafluoride, titanium tetrachloride, tin tetrachloride and zinc dichloride.

In some embodiments of the first aspect of this application, the nanofibers include a flat ribbon fiber. A ratio of a length value at a widest position to a length value at a narrowest position of a cross-section of the flat ribbon fiber is 2 to 100.

In some embodiments of the first aspect of this application, The ratio of the length value at a widest position to the length value at a narrowest position of a cross-section of the flat ribbon fiber is 5 to 20.

In some embodiments of the first aspect of this application, the nanofibers are selected from the group consisting of polyvinylidene difluoride, polyimide, polyamide, polyacrylonitrile, polyethylene glycol, polyethylene oxide, polyphenylene ether, polypropylene carbonate, polymethyl methacrylate, polyethylene terephthalate, polyvinylidene difluoride-hexafluoropropylene, polyvinylidene difluoride-chlorotrifluoroethylene, or a derivative thereof, and preferably include at least one of polyvinylidene difluoride-hexafluoropropylene, polyvinylidene difluoride, polyacrylonitrile, polymethyl methacrylate, polyphenylene ether, polypropylene carbonate, polyethylene oxide, and a derivative thereof.

In some embodiments of the first aspect of this application, the porous layer is characterized by at least one of the following:

(a) an air permeability of the porous layer is 5 s/100 cm³ to 400 s/100 cm³;

(b) a porosity of the porous layer is 30% to 95%;

(c) an average pore diameter of the porous layer is 20 nm to 10 μm;

(d) a thickness of the porous layer is 1 μm to 20 μm;

(e) pore diameters of the porous layer in a thickness direction from a region farther away from the electrode plate to a region closer to the electrode plate decrease linearly;

(f) the pore diameters of the porous layer in the thickness direction from a region farther away from the electrode plate to a region closer to the electrode plate decrease nonlinearly; and (g) the pore diameters of the porous layer in the thickness direction from a region farther away from the electrode plate to a region closer to the electrode plate decrease discontinuously.

In some embodiments of the first aspect of this application, a number of the inorganic particles per unit area of the porous layer is $5 \times 10^7/m^2$ to $3 \times 10^{19}/m^2$.

In some embodiments of the first aspect of this application, a mass of the inorganic particles per unit area of the porous layer is 0.004 g/m² to 60 g/m².

In some embodiments of the first aspect of this application, an average particle diameter of the inorganic particles is 0.01 μm to 10 μm.

In some embodiments of the first aspect of this application, the inorganic particles are selected from the group consisting of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$, boehmite, magnesium hydroxide, aluminum hydroxide, lithium phosphate, lithium titanium phosphate, lithium aluminum titanium phosphate, lithium lanthanum titanate, lithium germanium thiophosphate, lithium nitride, $SiS_2$ glass, $P_2S_5$ glass, Li2O, LiF, LiOH, $Li_2CO_3$, $LiAlO_2$, $Li_2O$—$Al_2O_3$—$SiO_2$—$P_2O_5$—$TiO_2$—$GeO_2$ ceramic and garnet ceramic.

In some embodiments of the first aspect of this application, the porous layer is prepared by electrospinning, air spinning, or centrifugal spinning.

In some embodiments of the first aspect of this application, each of the nanofibers includes a core layer and a shell layer, and the crosslinker and the initiator are included in the shell layer.

A second aspect of this application provides an electronic device, including the electrochemical device according to the first aspect of this application.

In the electrochemical device according to this application, the nanofibers are crosslinked and bonded to the surface of the inorganic particles by the crosslinker, thereby alleviating the problem of relative slip between the fibers of the porous layer and improving the mechanical strength of the porous layer.

BRIEF DESCRIPTION OF DRAWINGS

To describe the technical solutions in the embodiments of this application or the prior art more clearly, the following outlines the drawings to be used in the embodiments of this application or the prior art. Evidently, the drawings outlined below merely illustrate some embodiments of this application, and a person of ordinary skill in the art may derive other drawings from such drawings without making any creative effort.

DETAILED DESCRIPTION

To make the objectives, technical solutions, and advantages of this application clearer, the following describes this application in more detail with reference to drawings and embodiments. Evidently, the described embodiments are merely a part of but not all of the embodiments of this application. All other embodiments derived by a person of ordinary skill in the art based on the embodiments of this application without making any creative efforts fall within the protection scope of this application.

The electrochemical device according to this application may be any electrochemical device that uses an electrode plate and a porous layer, and may be, for example, a lithium-ion battery, or a capacitor. The following description uses a lithium-ion battery as an example. A person skilled in the art understands that the following description is merely illustrative without limiting the protection scope of this application.

Figure 1:
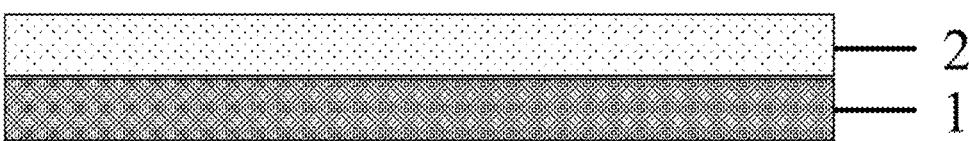
FIG. 1 is a schematic structural diagram of an implementation solution according to this application.
Figure 2:
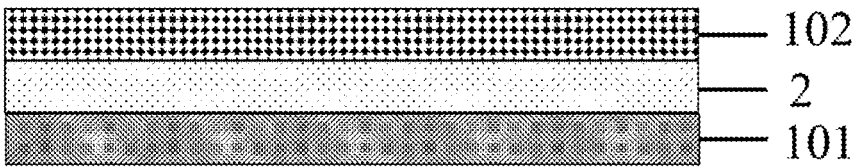
FIG. 2 is a schematic structural diagram of another implementation solution according to this application.
Figure 3:
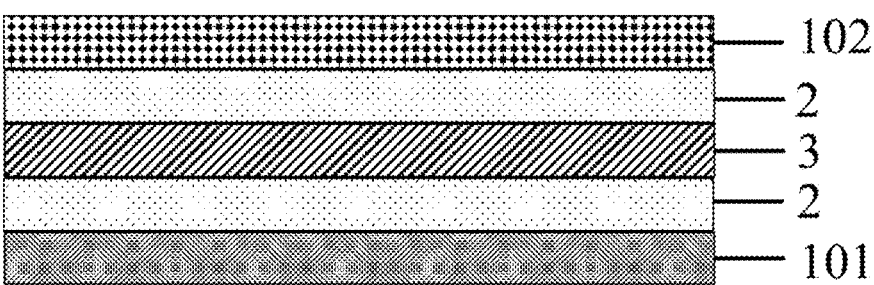
FIG. 3 is a schematic structural diagram of another implementation solution according to this application.

An aspect of this application provides an electrochemical device. As shown in FIG. 1 to FIG. 3, the electrochemical device includes an electrode plate 1 and a porous layer 2 formed on a surface of the electrode plate 1. The porous layer 2 includes nanofibers and inorganic particles. The nanofibers and the inorganic particles are bonded together by a crosslinker.

The electrode plate 1 may be a positive electrode plate 101 and/or a negative electrode plate 102. The porous layer 2 may be disposed on the positive electrode plate 101 and/or the negative electrode plate 102 to separate the positive electrode plate 101 from the negative electrode plate 102. The porous layer 2 may be disposed on one surface or both surfaces of the positive electrode plate and/or the negative electrode plate.

In some embodiments of this application, an initiator is further included in the porous layer. Based on a total mass of the porous layer, a weight percent of the nanofibers is 4.9 wt % to 95 wt %, a weight percent of the inorganic particles is 4.9 wt % to 95 wt %, a weight percent of the crosslinker plus the initiator is 0.1 wt % to 40 wt %, and a mass of the initiator is 5% to 20% of a total mass of the crosslinker and the initiator.

Because the nanofibers are bonded to the inorganic particles by a crosslinker, the nanofibers and the inorganic particles are bonded into a whole, thereby preventing the inorganic particles from sliding between the nanofibers, increasing the overall strength of the porous layer, and prevent the porous layer from being penetrated by positive or negative active material particles.

Through in-depth research, the inventor of this application finds that a penetration strength P N/20 μm of the porous layer and a percentage M of a mass of the inorganic particles in a total mass of the porous layer satisfy the following relational expression:

$$9 \le \frac{P}{M+1} \le 150.$$

In the formula above, the penetration strength P is measured in units of N/20 μm.

In some embodiments of this application, the nanofibers are bonded together directionally or randomly to form a porous substrate. The random lap-joint between the nanofibers forms a large number of pores configured to transport ions. The nanofibers themselves serve as a framework configured to support the porous layer. The inorganic particles are distributed in the porous substrate. By introducing the crosslinker and the initiator to the surface of the nanofibers and/or the surface of the inorganic particles, this application makes the nanofibers bonded together by cros slinking at intersections, thereby preventing the nanofibers from sliding against each other. In addition, with the nanofibers and the inorganic particles bonded together by crosslinking at contact positions, the slide of the inorganic particles against the nanofibers is prevented, thereby increasing the strength of the porous layer. In this application, the nanofibers are usually bonded together at the intersections, and some fibers may be bonded in a larger area (for example, two nanofibers are bonded together in such a way that one nanofiber is parallel to the other at some positions). The bonding between the inorganic particles and the nanofibers may be bonding at a single point or bonding in a larger area. For example, when a nanofiber is lap-jointed to an inorganic particle, line bonding may be formed, thereby further improving the strength of the porous layer and preventing the porous layer from being penetrated by the positive or negative active material particles.

In some embodiments of this application, the penetration strength of the porous layer satisfies P≥16. In some embodiments of this application, P≥20.

The way of introducing the crosslinker and the initiator is not particularly limited in this application, as long as the objectives of this application can be achieved. For example, the crosslinker and the initiator may be introduced into a nanofiber-forming polymer solution, or the crosslinker and the initiator may be introduced into an inorganic particle suspension, or the crosslinker and the initiator may be introduced into both the nanofiber-forming polymer solution and the inorganic particle suspension.

The type of the crosslinker is not particularly limited, and may be any crosslinker well known in the art. For example, the crosslinker may be at least one selected from isocyanate, hexamethoxymethylmelamine, N-methylol acrylamide, carbodi-imide, trimethylolpropane, aziridine, dicumyl peroxide, butyl acrylate, N,N'-methylene bisacrylamide, 2,5-dimethyl-2,5-bis(tert-butylperoxide)hexane, bisphenol A epoxy resin, an acrylate derivative, a nitrile-containing polymer, styrene, vinyl fluoride, acrylonitrile, acrylamide, vinyl acetate, alkyl vinyl ether, alkylene oxide, or a trimethylene oxide derivative. One of such crosslinkers may be used alone, or two or more thereof may be used in combination.

The type of the initiator is not particularly limited, and may be any initiator well known in the art. For example, the initiator may be a free-radical polymerized initiator selected from peroxide-, azo-, redox-initiators, or the like, and specifically, may be benzoyl peroxide, tert-butyl benzoyl peroxide, methyl ethyl ketone peroxide, azobisisobutyronitrile, azobisisoheptanenitrile, dimethyl azobisisobutyrate, or azobisisobutylamidine hydrochloride. Alternatively, the initiator may be a cationic polymerized initiator such as at least one selected from boron trifluoride, phosphorus pentafluoride, titanium tetrachloride, tin tetrachloride, or zinc dichloride. One of such initiators may be used alone, or two or more thereof may be used in combination.

The type of the nanofibers is not particularly limited, and may be any nanofibers well known in the art. In an embodiment of this application, the nanofibers are polymer nanofibers. The type of the polymer is not particularly limited, as long as the polymer can form the porous layer according to this application. For example, the polymer is at least one selected from polyvinylidene difluoride, polyimide, polyamide, polyacrylonitrile, polyethylene glycol, polyethylene oxide, polyphenylene ether, polypropylene carbonate, polymethyl methacrylate, polyethylene terephthalate, polyvinylidene difluoride-hexafluoropropylene, polyvinylidene difluoride-chlorotrifluoroethylene, or a derivative thereof, and preferably includes at least one of polyvinylidene difluoride-hexafluoropropylene, polyvinylidene difluoride, polyacrylonitrile, polymethyl methacrylate, polyphenylene ether, polypropylene carbonate, polyethylene oxide, or a derivative thereof. One of such polymers may be used alone, or two or more thereof may be used in combination.

The diameter of the nanofibers is not particularly limited, as long as the objectives of this application can be achieved. For example, the diameter of the nanofibers is 20 nm to 2 μm, preferably 50 nm to 1 μm, and more preferably 100 nm to 500 nm.

The cross-sectional shape of the nanofibers is not particularly limited, and may be any shape. Preferably the cross-sectional shape of the nanofibers is a flat ribbon. For example, a length-to-width ratio of a cross section of a nanofiber is 2 to 100, and preferably 5-20. The length-to-width ratio is a ratio of a length value at a widest position to a length value at a narrowest position of the cross-section of the flat ribbon fiber. By making the cross-section of the nanofibers into a flat ribbon shape, this application can further increase the contact area between the nanofibers and the contact area between a nanofiber and an inorganic particle, thereby further strengthening the bonding between the nanofibers and the bonding between a nanofiber and an inorganic particle. In this way, the penetration strength of the porous layer is further improved, and the porous layer is more resistant to the penetration by the positive or negative active material particles.

In a preferred embodiment of this application, the nanofibers are a coaxial structure. The coaxial structure includes a first fiber serving as a core layer, and a second fiber serving as a shell layer. The first fiber as the core layer mainly contains a polymer. The second fiber as the shell layer on the surface of the core layer contains a crosslinker and an initiator. The diameter of the coaxial nanofibers is not particularly limited, as long as the objectives of this application can be achieved. For example, the diameter of the nanofibers may be 20 nm to 2 μm, preferably 50 nm to 1 μm, and more preferably 100 nm to 500 nm. A ratio of a diameter of the first fiber to an outer diameter of the second fiber is not particularly limited, and may be, for example, 0.98 to 0.6, and preferably 0.9 to 0.7. When this ratio falls within the range specified above, good bonding is implemented between the nanofibers, and good bonding is implemented between a nanofiber and an inorganic particle, thereby further improving the penetration strength of the porous layer.

The method for preparing the coaxial nanofibers is not limited in this application. For example, the preparation method may include the following steps:

1) Dissolving a polymer in an organic solvent to obtain a polymer solution A;
2) Dispersing a crosslinker and an initiator in the organic solvent to obtain a solution B;
3) Injecting the foregoing two solutions concurrently by using a coaxial spinning apparatus, where the solution A is located in the core layer, and the solution B is located in the shell layer; and
4) The ejected coaxial fibers are the coaxial nanofibers. The coaxial nanofibers may be directly collected from the surface of the positive electrode plate and/or the negative electrode plate.

The inorganic particles are not particularly limited, and may be, for example, at least one selected from $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$, boehmite, magnesium hydroxide, aluminum hydroxide, lithium phosphate, lithium titanium phosphate, lithium aluminum titanium phosphate, lithium lanthanum titanate, lithium germanium thiophosphate, lithium nitride, $SiS_2$ glass, $P_2S_5$ glass, $Li_2O$, LiF, LiOH, $Li_2CO_3$, $LiAlO_2$, $Li_2O$—$Al_2O_3$—$SiO_2$—$P_2O_5$—$TiO_2$—$GeO_2$ ceramic, or garnet ceramic. One of such inorganic particles may be used alone, or two or more thereof may be used in combination.

The average particle diameter of the inorganic particles is not particularly limited, and may be, for example, 0.01 μm to 10 μm, and preferably 20 nm to 5 μm. A ratio of the diameter of the nanofibers to the average particle diameter of the inorganic particles is not particularly limited, and may be, for example, 1:2 to 1:200, and preferably 1:3 to 1:20.

The number of the inorganic particles in the porous layer may be $5×10^7/m^2$ to $3×10^{19}/m^2$.

The mass of the inorganic particles in the porous layer may be 0.004 $g/m^2$ to 60 $g/m^2$.

The thickness of the porous layer is not particularly limited, and is preferably less than the thickness of a separator in the prior art. For example, the thickness of the porous layer according to this application may be 1 μm to 20 μm, and preferably 5 μm to 10 μm. Because the thickness of the porous layer according to this application is less than the thickness of the separator in the prior art, the porous layer increases the energy density of the battery.

The porosity of the porous layer is not particularly limited, but is preferably 30% to 95% in order to improve electrolyte retainability. The air permeability of the porous layer is not particularly limited in this application, as long as the objectives of this application can be achieved. For example, the air permeability may be 5 s/100 cm³ to 400 s/100 cm³. Without being limited to any theory, the inventor of this application holds that the ion conductivity is further improved by controlling the air permeability within the range specified above.

The average pore diameter of the porous layer according to this application is not particularly limited, and may be 20 nm to 10 μm. The pore diameters of the porous layer according to this application may be uniformly distributed in the entire porous layer, or distributed in the porous layer according to a given rule, without being particularly limited, as long as the objectives of this application can be achieved. For example, in a preferred embodiment of this application, the pore diameters of the porous layer in a thickness direction from a region farther away from the electrode plate to a region closer to the electrode plate decrease linearly. In another preferred embodiment of this application, the pore diameters of the porous layer in the thickness direction from a region farther away from the electrode plate to a region closer to the electrode plate decrease nonlinearly. In another embodiment of this application, the pore diameters of the porous layer in the thickness direction from a region farther away from the electrode plate to a region closer to the electrode plate decrease discontinuously, that is, vary between layers. The number of layers is not particularly limited, and, for ease of preparation, may be 2 to 10 layers, and preferably 2 to 5 layers.

In some embodiments of this application, as shown in FIG. 3, one or more inorganic material layers 3 may overlay the outer surface between the pore-diameter-varying fiber layers inside the porous layer 2 to further improve the mechanical strength and ensure high insulation performance. The inorganic material layer is of some mechanical strength, and is electronically insulative, and preferably is an inorganic material capable of conducting lithium ions. The thickness of the inorganic material layer 3 is 0.1 μm to 20 μm. A deficient thickness brings no effects of improving the mechanical strength and suppressing particle penetration and lithium dendrite growth. An excessive thickness impedes lithium ion conduction, increases battery polarization, and hinders exertion of performance. The porosity of the inorganic material layer is 10% to 40%, and the average pore diameter thereof is 0.1 μm to 1 μm. Generally, the electronic resistivity of the inorganic material layer is greater than $10^7$ Ω·m. Preferably, the electronic resistivity is greater than $10^{10}$ Ω·m. The ionic conductivity of the inorganic material layer is required to range from $10^{-2}$ S/cm to $10^{-8}$ S/cm.

The method of bonding between the inorganic material layer 3 and the porous layer 2 is not particularly limited. For example, the bonding may be implemented by the following methods:

1. Hot pressing and/or binding. In the hot pressing method, the hot pressing temperature needs to be a melting point of the inorganic material layer or a melting point of the porous layer, whichever is lower. The pressure needs to be 0.1 MPa to 1 MPa. In the binding method, the binder is not particularly limited, and may be, for example, one or more of polyamide, polyurethane, poly(ethylene-co-vinyl acetate) (EVA), poly(ethylene-co-vinyl alcohol) (EVOH), acrylate, or polyvinylidene difluoride.

2. If the inorganic material layer 3 is directly deposited on or applied to the porous layer 2, the binder is not necessarily used, and the bonding may be formed naturally.

The type of the lithium-ion battery according to this application is not particularly limited, and may be any type of lithium-ion battery, for example, a button-type, cylindrical, or pouch-type lithium-ion battery. The lithium-ion battery according to this application includes a positive electrode, a negative electrode, an electrolytic solution, and a porous layer according to this application. In an embodiment of this application, the porous layer may be formed on a surface of the positive electrode plate and a surface of the negative electrode plate, and then the "negative electrode plate+porous layer" and the "positive electrode plate+porous layer" are stacked together to form a stacked structure of the lithium-ion battery. In another embodiment of this application, the porous layer may be formed on both surfaces of the positive electrode plate, and then the negative electrode plate, and the "porous layer+positive electrode plate+porous layer" may be stacked together to form a stacked structure of the lithium-ion battery, without applying a porous layer onto the surface of the negative electrode plate. In another embodiment of this application, the porous layer may be formed on both surfaces of the negative electrode plate, and then the "porous layer+negative electrode plate+porous layer" and the positive electrode plate are stacked together to form a stacked structure of the lithium-ion battery. The stacked structure formed in this way may be further stacked in the foregoing sequence, or may be wound directly to form a multilayer stacked structure of the lithium-ion battery. The stacking method is not particularly limited in this application, and may be selected by a person skilled in the art as actually required.

In embodiments of this application, the positive electrode plate is not particularly limited, as long as the objectives of this application can be achieved. For example, the positive electrode plate generally includes a positive current collector and a positive active material layer, and the positive active material layer includes a positive active material. The positive current collector is not particularly limited, and may be any positive current collector well known in the art. For example, the positive current collector may be a copper foil, an aluminum foil, an aluminum alloy foil, or a composite current collector. The positive active material is not particularly limited, and may be any positive active material in the prior art. The positive active material is at least one selected from lithium nickel cobalt manganese oxide, lithium nickel cobalt aluminum oxide, lithium iron phosphate, lithium cobaltate, lithium manganate, or lithium manganese iron phosphate.

Optionally, the positive electrode plate may further include a conductive layer. The conductive layer is located between the positive current collector and the positive active material layer. The composition of the conductive layer is not particularly limited, and may be a conductive layer commonly used in the art.

In embodiments of this application, the negative electrode plate is not particularly limited, as long as the objectives of this application can be achieved. For example, the negative electrode plate generally includes a negative current collector and a negative active material layer, and the negative active material layer includes a negative active material. The negative current collector is not particularly limited, and may be any negative current collector well known in the art. For example, the negative current collector may be a copper foil, an aluminum foil, an aluminum alloy foil, or a composite current collector. The negative active material is not particularly limited, and may be any negative active material well known in the art. For example, the negative active material may include at least one of artificial graphite, natural graphite, mesocarbon microbead, silicon, silicon carbon, silicon-oxygen compound, soft carbon, hard carbon, lithium titanium oxide, or niobium titanium oxide.

The electrolytic solution of the lithium-ion battery is not particularly limited, and may be any electrolytic well known in the art. The electrolytic solution may be in a gel state, a solid state, or a liquid state. For example, the liquid-state electrolytic solution includes a lithium salt and a nonaqueous solvent.

The lithium salt is not particularly limited, and may be any lithium salt well known in the art, as long as the objectives of this application can be achieved. For example, the lithium salt may be at least one selected from $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, or $LiPO_2F_2$. For example, the lithium salt may be $LiPF_6$.

The nonaqueous solvent is not particularly limited, as long as the objectives of this application can be achieved. For example, the nonaqueous solvent may be at least one selected from carbonate compound, a carboxylate compound, an ether compound, a nitrile compound, or another organic solvent.

For example, the carbonate compound may be at least one selected from diethyl carbonate (DEC), dimethyl carbonate (DMC), dipropyl carbonate (DPC), methyl propyl carbonate (MPC), ethylene propyl carbonate (EPC), ethylene carbonate (EC), propylene carbonate (PC), butylene carbonate (BC), vinyl ethylene carbonate (VEC), fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methyl ethylene, 1-fluoro-1-methyl ethylene carbonate, 1,2-difluoro-1-methyl ethylene carbonate, 1,1,2-trifluoro-2-methyl ethylene carbonate, or trifluoromethyl ethylene carbonate.

The method for depositing the nanofibers and the inorganic particles is not particularly limited, and may be any deposition method well known in the art. For example, the porous substrate may be prepared by electrospinning, air spinning, or centrifugal spinning, and the inorganic particles may be prepared by electrospraying. The sequence of depositing the nanofibers and the inorganic particles is not particularly limited, as long as the porous layer according to this application can be formed. The porous layer includes a nanofibrous porous substrate and inorganic particles distributed in the porous substrate. For example, the nanofibers and the inorganic particles may be deposited simultaneously.

The porous substrate may be implemented by using any spinning equipment known in the art, without being particularly limited, as long as the objectives of this application can be achieved. The spinning equipment may be any spinning equipment known in the art or commercially available.

Electrospraying is also known as electrostatic spraying. In a process of electrostatic spraying of particles, a spraying apparatus is filled with a particle suspension. Droplets of the suspension are retained at a nozzle by a surface tension under an externally applied electrical field. The surface of the suspension droplets accumulates charges as induced by the electrical field, and is subjected to an electrical field force exerted in a direction opposite to the surface tension. The suspension droplets at the nozzle leave the nozzle and move toward a deposition destination under the action of the electrical field, and are deposited on the destination.

The electro spraying may be implemented by any equipment known in the art, without being particularly limited, as long as the objectives of this application can be achieved. For example, the equipment may be any equipment known to a person skilled in the art or commercially available.

Another aspect of this application provides an electronic device. The electronic device includes the electrochemical device according to this application.

Terms and Definitions

Number of inorganic particles: the number of inorganic particles per unit area of the porous layer.

Average particle diameter of inorganic particles: The average particle diameter of inorganic particles is a particle diameter measured when a cumulative volume of measured particles reaches 50% of the total volume by counting from a small-sized particle side in a volume-based particle size distribution curve of the inorganic particles, where the particle size distribution curve is plotted by using a laser particle size analyzer.

Test Methods:

Self-Discharge Rate K of the Lithium-Ion Battery:

Discharging the lithium-ion battery at a current of 0.5 C until the voltage reaches 3.0 V, leaving the battery to stand for 5 minutes, then charging the lithium-ion battery at a constant current of 0.5 C until the voltage reaches 3.85 V, and then charging the battery at a constant voltage of 3.85 V until the current reaches 0.05 C. Leaving the battery to stand in a 25° C.±3° C. environment for two days, and measuring and recording the voltage OCV 1 at this time. Next, leaving the lithium-ion battery to stand in an environment of 25° C.±3° C. for two days, measuring and recording the voltage OCV2 at this time, and calculating a K value according to a formula: K (mV/h)=(OCV2−OCV1)/48 h×1000.

Porosity of the Porous Layer:

Disassembling the lithium-ion battery after the discharge, so as to obtain an electrode plate overlaid with a porous layer. Taking a part of the porous layer as a specimen, and measuring the porosity of the porous layer by conventional mercury intrusion porosimetry.

Capacity Retention Rate:

Charging a lithium-ion battery at a constant current of 0.5 C until the voltage reaches 4.4 V, then charging the battery at a constant voltage of 4.4 V until the current reaches 0.05 C, leaving the battery to stand for 10 minutes in a 25° C.±3° C. environment, and then discharging the battery at a current of 0.5 C until the voltage reaches 3.0 V, and recording a first-cycle discharge capacity as $Q_1$. Repeating the foregoing charge and discharge process for 50 cycles, and then recording the discharge capacity at this time as $Q_{50}$. Calculating a $50^{th}$-cycle capacity retention rate η according to the following formula: $\eta = Q_{50}/Q_1 \times 100\%$.

Penetration Strength of the Porous Layer:

Measuring the penetration strength of the porous layer by using a microcomputer-controlled electronic universal tester (MTS-E44.104).

Test Process:

Disassembling a lithium-ion battery, and taking out a part of a stacked three-layer structure of a positive electrode plate, a porous layer, and a negative electrode plate to serve as a specimen. Oven-drying the specimen at 80° C. for 2 hours, and placing the specimen on an aluminum plate on a side of a pressure testing machine. Placing a steel ball (made of iron, 5 mm in diameter) on the specimen. Applying a 10 V voltage between tabs of the two electrode plates, and exerting a pressure on the surface of the specimen through the aluminum plates on both sides at a pressing speed of 0.1 mm/min in the vertical direction. When the resistance changes sharply, recording the pressure as the penetration strength.

EMBODIMENTS

Preparation Example 1: Preparing A Negative Electrode Plate

Mixing artificial graphite as a negative active material, conductive carbon black (Super P), and the styrene butadiene rubber at a weight ratio of 96:1.5:2.5, adding deionized water as a solvent, and stirring evenly to obtain a slurry. Coating one surface of a 10-μm-thick negative current collector copper foil evenly with the slurry, and drying the slurry at a temperature of 110° C. to obtain a negative electrode plate coated with a 150-μm-thick negative active material layer on one side. Repeating the foregoing steps on the other surface of the negative electrode plate to obtain a negative electrode plate coated with the negative active material layer on both sides. Then cutting the negative electrode plate into a size of 41 mm×61 mm for future use.

Preparation Example 2: Preparing A Positive Electrode Plate

Mixing lithium cobalt oxide as a positive active material, conductive carbon black (Super P), and polyvinylidene difluoride at a weight ratio of 97.5:1.0:1.5, adding N-methyl pyrrolidone as a solvent, and stirring evenly. Coating a positive current collector aluminum foil evenly with the slurry, and drying the slurry at a temperature of 90° C. to obtain a positive electrode plate coated with a 100-μm-thick positive active material layer on one side. Repeating the foregoing steps on the other surface of the positive current collector aluminum foil to obtain a positive electrode plate of which both sides are coated with the positive active material layer. Then cutting the positive electrode plate into a size of 38 mm×58 mm for future use.

Preparation Example 3: Preparing an Electrolytic Solution

Mixing ethylene carbonate (EC), ethyl methyl carbonate (EMC), and diethyl carbonate (DEC) at a mass ratio of EC:EMC:DEC=30:50:20 in an dry argon atmosphere to form an organic solvent, then adding lithium salt hexafluorophosphate ($LiPF_6$) into the organic solvent to dissolve, and mixing the solution evenly to obtain an electrolytic solution in which a lithium salt concentration is 1.15 mol/L.

The following embodiments illustrate the preparation of an integrated porous layer of "nanofibrous porous substrate+inorganic particles" according to this application. The embodiments are illustrated by using a positive electrode plate as an example, and an integrated porous layer is deposited on both surfaces of the positive electrode plate. Understandably, the integrated porous layer may also be deposited on both surfaces of the negative electrode plate instead, or an integrated porous layer is deposited on one surface of the positive electrode plate and one surface of the negative electrode plate separately. Such implementation solutions can also achieve the objectives of this application. A person skilled in the art understands that such implementation solutions still fall within the protection scope of this application.

Embodiment 1

Dispersing 99.9 wt % polyvinylidene difluoride (PVDF), 0.09 wt % crosslinker acrylonitrile, and 0.01 wt % initiator boron trifluoride in a solvent of dimethylformamide and acetone mixed at a ratio of 7:3. In other words, adding the crosslinker and the initiator sparingly into a conventional electrospinning solution. Stirring evenly until the viscosity of the slurry is stable, so as to obtain a solution A with a solid content of 25 wt %. At the same time, dispersing 99.9 wt % boehmite, 0.09 wt % acrylonitrile, and 0.01 wt % boron trifluoride in a solvent of dimethylformamide and acetone mixed at a ratio of 7:3, and stirring evenly until the viscosity of the slurry is stable, so as to obtain a suspension B with a solid content of 40 wt %.

Making polyvinylidene difluoride nanofibers by using the solution A as an ingredient by electrospinning on the surface of the positive electrode plate prepared in Preparation Example 2, where the average diameter of the nanofibers is 100 nm. Electrospraying inorganic particles onto the surface of the positive electrode plate at the same time of spinning by using the suspension B as an ingredient, where the average particle diameter of the chosen inorganic particles is 500 nm, and a ratio of the average diameter of the nanofibers to the average particle diameter of the inorganic particles is 1:5. The thickness of the porous layer is 10 μm, the average pore diameter of the porous layer is 200 nm, and the porosity of the porous layer is 75%. Subsequently, repeating the foregoing steps on the other surface of the positive electrode plate, vacuum-drying at 40° C. to remove the solvents such as dimethylformamide, and then increasing the temperature to 80° C., and keeping the temperature for 6 hours so that crosslinking occurs under heat treatment to obtain a positive electrode plate coated with the porous layer on both sides. In the finally prepared porous layer, the weight percent of the polymer nanofibers is 95 wt %, the weight percent of the inorganic particles is 4.9 wt %, and the weight percent of the crosslinker plus the initiator is 0.1 wt %.

Embodiments 2 to 5

Figure 5:
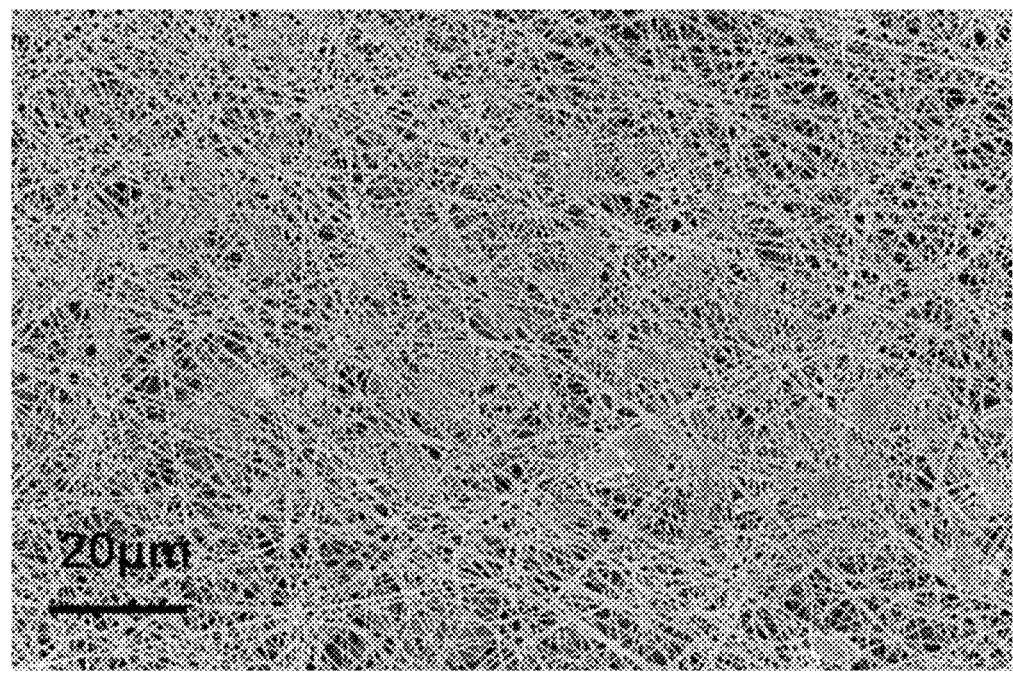
FIG. 5 is a micrograph of a porous layer according to Embodiment 2 of this application.

Identical to Embodiment 1 except that the weight percent of the nanofibers and inorganic particles in the porous layer is adjusted separately according to Table 1, where a micrograph of the porous layer in Embodiment 2 is shown in FIG. 5.

Embodiment 6

Dispersing 99 wt % polyvinylidene difluoride, 0.9 wt % acrylonitrile, and 0.1 wt % boron trifluoride in a solvent of dimethylformamide and acetone mixed at a ratio of 7:3, and stirring evenly until the viscosity of the slurry is stable, so as to obtain a solution A with a solid content of 25 wt %. At the same time, dispersing 99 wt % boehmite, 0.9 wt % acrylonitrile, and 0.1 wt % boron trifluoride in a solvent of dimethylformamide and acetone mixed at a ratio of 7:3, and stirring evenly until the viscosity of the slurry is stable, so as to obtain a suspension B with a solid content of 40 wt %.

Performing the same method as in Embodiment 1 by using the solution A and the suspension B as ingredients, so as to make a positive electrode plate coated with the porous layer on both sides. In the finally prepared porous layer, the weight percent of the nanofibers is 69 wt %, the weight percent of the inorganic particles is 30 wt %, and the weight percent of the crosslinker plus the initiator is 1 wt %.

The rest is the same as Embodiment 1.

Embodiment 7

Dispersing 95 wt % polyvinylidene difluoride, 4.5 wt % acrylonitrile, and 0.5 wt % boron trifluoride in a solvent of dimethylformamide and acetone mixed at a ratio of 7:3, and stirring evenly until the viscosity of the slurry is stable, so as to obtain a solution A with a solid content of 25 wt %. At the same time, dispersing 95 wt % boehmite, 4.5 wt % acrylonitrile, and 0.5 wt % boron trifluoride in a solvent of dimethylformamide and acetone mixed at a ratio of 7:3, and stirring evenly until the viscosity of the slurry is stable, so as to obtain a suspension B with a solid content of 40 wt %.

Performing the same method as in Embodiment 1 by using the solution A and the suspension B as ingredients, so as to make a positive electrode plate coated with the porous layer on both sides. In the finally prepared porous layer, the weight percent of the nanofibers is 65 wt %, the weight percent of the inorganic particles is 30 wt %, and the weight percent of the crosslinker plus the initiator is 5 wt %.

The rest is the same as Embodiment 1.

Embodiment 8

Dispersing 93 wt % polyvinylidene difluoride, 6.3 wt % acrylonitrile, and 0.7 wt % boron trifluoride in a solvent of dimethylformamide and acetone mixed at a ratio of 7:3, and stirring evenly until the viscosity of the slurry is stable, so as to obtain a solution A with a solid content of 25 wt %. At the same time, dispersing 93 wt % boehmite, 6.3 wt % acrylonitrile, and 0.7 wt % boron trifluoride in a solvent of dimethylformamide and acetone mixed at a ratio of 7:3, and stirring evenly until the viscosity of the slurry is stable, so as to obtain a suspension B with a solid content of 40 wt %.

Performing the same method as in Embodiment 1 by using the solution A and the suspension B as ingredients, so as to make a positive electrode plate coated with the porous layer on both sides. In the finally prepared porous layer, the weight percent of the nanofibers is 63 wt %, the weight percent of the inorganic particles is 30 wt %, and the weight percent of the crosslinker plus the initiator is 7 wt %.

The rest is the same as Embodiment 1.

Embodiment 9

Identical to Embodiment 7 except that the polyvinylidene difluoride in the solution A is replaced with polyvinylidene difluoride-hexafluoropropylene (PVDF-HFP).

Embodiment 10

Identical to Embodiment 7 except that the boehmite in the suspension B is replaced with $ZrO_2$.

Embodiment 11

Identical to Embodiment 7 except that the crosslinker in the solution A is triethylene glycol diacrylate and the initiator is lauroyl peroxide.

Embodiment 12

Identical to Embodiment 7 except that the average particle diameter of the inorganic particles is adjusted to 200 nm.

Embodiment 13

Identical to Embodiment 7 except that the average particle diameter of the inorganic particles is adjusted to 1000 nm.

Embodiment 14

Identical to Embodiment 12 except that the average diameter of the nanofibers is adjusted to 50 nm, and the average particle diameter of the inorganic particles is adjusted to 10000 nm according to Table 1.

Embodiment 15

Identical to Embodiment 13 except that the average pore diameter of the porous layer closer to the positive electrode plate is 200 nm, the average pore diameter of the porous layer farther away from the positive electrode plate is 1000 nm, the average pore diameter of the porous layer in the middle region increases linearly with the increase of the distance from the surface of the electrode plate, so that the average pore diameters of the porous layer change stepwise.

Embodiment 16

Identical to Embodiment 13 except that the electrospinning nozzle is a flat nozzle so as to obtain flat ribbon nanofibers, and, in a cross-section of a nanofiber, a long diameter is 100 nm, a length-to-width ratio is 20, and a ratio of the long diameter of the cross-section of the nanofiber to the average particle diameter of the inorganic particles is 1:10.

Embodiment 17

Dispersing PVDF in a solvent of dimethylformamide and acetone mixed at a ratio of 7:3, and stirring evenly until the viscosity of the slurry is stable, so as to obtain a solution A with a solid content of 25 wt %; and dispersing 95 wt % boehmite, 4.5 wt % acrylonitrile, and 0.5 wt % boron trifluoride in a solvent of dimethylformamide and acetone mixed at a ratio of 7:3, and stirring evenly until the viscosity of the slurry is stable, so as to obtain a suspension B with a solid content of 40 wt %. Dispersing 90 wt % acrylonitrile, and 10 wt % boron trifluoride in a solvent of dimethylformamide and acetone mixed at a ratio of 7:3, and stirring evenly until the viscosity of the slurry is stable, so as to obtain a solution C with a solid content of 25 wt %.

Preparing a coaxial PVDF/(acrylonitrile+boron trifluoride) nanofiber substrate by electrospinning on the surface of the positive electrode plate in Preparation Example 2 by using the solution A and the solution C as ingredients. Selecting a two-tube-sleeved nozzle as an electrospinning nozzle, in which the inner tube is configured to pass the solution A, and a space between the inner tube and the outer tube is configured to pass the solution C. Performing electrospinning to obtain coaxial nanofibers in which the core layer is PVDF fibers and the shell layer is "crosslinker+ initiator". The average diameter of the nanofibers is 100 nm, and a ratio of a core-layer fiber diameter to an outer diameter of a shell-layer fiber is 0.6. Electrospraying inorganic particles onto the surface of the positive electrode plate at the same time of spinning by using the suspension B as an ingredient, where the average particle diameter of the chosen inorganic particles is 1000 nm, and the ratio of the average diameter of the nanofibers to the average particle diameter of the inorganic particles is 1:10. The thickness of the porous layer is 10 μm, the average pore diameter of the porous layer is 200 nm, and the porosity of the porous layer is 75%. Subsequently, repeating the foregoing steps on the other surface of the positive electrode plate, vacuum-drying at 40° C. to remove the dispersants such as dimethylformamide, and then increasing the temperature to 80° C., and keeping the temperature for 6 hours so that crosslinking occurs under heat treatment to obtain a positive electrode plate coated with the porous layer on both sides. In the finally prepared porous layer, the weight percent of the nanofibers is 30 wt %, the weight percent of the inorganic particles is 30 wt %, and the weight percent of the crosslinker plus the initiator is 40 wt %.

Embodiment 18

Identical to Embodiment 17 except that the amount of the passed solution A and solution C in the electrospinning parameters is changed so that in the finally prepared porous layer, the weight percent of nanofibers is 55 wt %, the weight percent of crosslinker plus the initiator is 15 wt %, and the ratio of the core-layer fiber diameter to the outer diameter of the shell-layer fiber is adjusted to 0.85.

Embodiment 19

Identical to Embodiment 17 except that the amount of the passed solution A and solution C in the electrospinning parameters is changed so that in the finally prepared porous layer, the weight percent of nanofibers is 67 wt %, the weight percent of crosslinker plus the initiator is 3 wt %, and the ratio of the core-layer fiber diameter to the outer diameter of the shell-layer fiber is adjusted to 0.98.

Embodiment 20

Identical to Embodiment 13 except that the average particle diameter of the inorganic particles is adjusted to 5000 nm.

Embodiment 21

Identical to Embodiment 13 except that the average pore diameter of the porous layer is adjusted to 800 nm.

Embodiment 22

Identical to Embodiment 13 except that the thickness of the porous layer is adjusted to 5 μm.

Embodiment 23

Identical to Embodiment 13 except that the porosity of the porous layer is adjusted to 90%.

Embodiment 24

Mixing conductive carbon black (Super P), and the styrene butadiene rubber (SBR) at a weight ratio of 97:3, adding deionized water ($H_2O$) as a solvent, blending the mixture into a slurry with a solid content of 85%, and stirring the slurry evenly. Coating a positive current collector aluminum foil with the slurry evenly, and drying at 110° C. to obtain a positive conductive layer that is 2 μm in thickness.

Mixing lithium cobalt oxide ($LiCoO_2$) as a positive active material, conductive carbon black (Super P), and polyvinylidene difluoride (PVDF) at a mass ratio of 97.5:1.0:1.5, adding N-methyl-pyrrolidone (NMP) as a solvent, blending the mixture into a slurry with a solid content of 75%, and stirring the slurry evenly. Coating the positive conductive layer of a 10-μm-thick positive current collector aluminum foil with the slurry evenly, and drying the current collector at a temperature of 90° C. to obtain a positive electrode plate on which the conductive layer is 2 μm thick. Repeating the foregoing steps on the other surface of the positive current collector aluminum foil to obtain a positive electrode plate coated with the conductive layer and the positive active material layer on both sides. Then cutting the positive electrode plate into a size of 38 mm×58 mm for future use. Repeating the steps in Embodiment 13 on the surface of the positive electrode plate to obtain a positive electrode plate with a positive conductive layer.

Embodiment 25

Preparing a positive electrode plate according to the steps in Embodiment 13;

Mixing inorganic ceramic particles aluminum oxide (Al$_2$O$_3$) and polyvinylidene difluoride (PVDF) at a weight ratio of 95:5, Adding N-methyl-pyrrolidone (NMP) as a solvent, blending the mixture into a slurry with a solid content of 80%, and stirring the slurry evenly. Coating the porous layer on one side of the prepared positive electrode plate with the slurry evenly, and drying at a temperature of 90° C. to obtain an inorganic material layer. The thickness of the inorganic material layer is 3 μm, the porosity is 30%, and the average pore diameter is 0.8 μm.

Repeating the same steps on the other surface of the positive electrode plate to obtain a positive electrode plate coated with the inorganic material layer on both sides.

Embodiment 26

Identical to Embodiment 1 except that the suspension B contains neither the crosslinker nor the initiator.
Preparing a Lithium-Ion Battery Aligning and stacking the negative electrode plate prepared in Preparation Example 1 and the positive electrode plate coated with a porous layer and obtained in each embodiment, as shown in FIG. 2. Fixing four corners of the entire stacked structure by using adhesive tape, and then placing the stacked structure into an aluminum plastic film package. Performing top-and-side sealing, injecting the electrolytic solution prepared in the Preparation Example 3, and sealing the package to obtain a stacked-type lithium-ion battery.

Comparative Embodiment 1

Using a 10 μm-thick polyethylene film as a separator, and placing the separator between the negative electrode plate and the positive electrode plate that are prepared in Preparation Example 1 and Preparation Example 2 respectively. Aligning the negative electrode plate, the positive electrode plate, and the separator and stacking them neatly. Fixing four corners of the entire stacked structure by using adhesive tape, and then placing the stacked structure into an aluminum plastic film package. Performing top-and-side sealing, injecting the electrolytic solution prepared in the Preparation Example 3, and sealing the package to obtain a stacked-type lithium-ion battery.

Comparative Embodiment 2

Dispersing 99.9 wt % PVDF, 0.09 wt % acrylonitrile, and 0.01 wt % boron trifluoride in a solvent of DMF and acetone mixed at a ratio of 7:3, and stirring evenly until the viscosity of the slurry is stable, so as to obtain a solution A with a solid content of 25 wt %.

Figure 4:
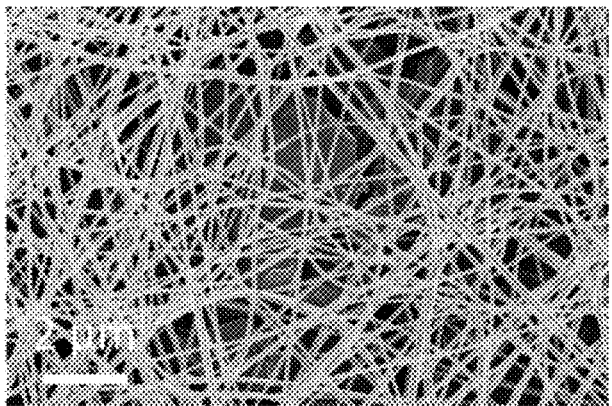
FIG. 4 is a micrograph of a fiber layer according to Comparative Embodiment 2 of this application.

Making a 10-μm-thick PVDF fiber layer by using the solution A as an ingredient by electrospinning on the surface of the positive electrode plate prepared in Preparation Example 2, where the average diameter of the fibers is 100 nm, the average pore diameter of the fiber layer is 400 nm, and the porosity is 75%. Repeating the foregoing steps on the other surface of the positive electrode plate, vacuum-drying at 40° C. to remove the dispersants such as DMF, and then increasing the temperature to 80° C., and keeping the temperature for 6 hours so that a crosslinking process is completed under heat treatment to obtain a positive electrode plate coated with the porous layer on both sides. In the obtained porous layer, the weight percent of polymer fibers is 99.9 wt %, and the weight percent of crosslinker plus the initiator is 0.1 wt %. A micrograph of the fiber layer of Comparative Embodiment 2 is shown in FIG. 4.

Aligning and stacking this positive electrode plate and the negative electrode plate prepared in Preparation Example 1, as shown in FIG. 2. Fixing four corners of the entire stacked structure by using adhesive tape, and then placing the stacked structure into an aluminum plastic film package. Performing top-and-side sealing, injecting the electrolytic solution prepared in the Preparation Example 3, and sealing the package to obtain a stacked-type lithium-ion battery.

The data and test results of the embodiments and comparative embodiments are shown in Table 1.

TABLE 1

| | Weight percent of nano-fibers (%) | Weight percent of inorganic particles (%) | Weight percent of cross-linker (%) | Weight percent of initiator (%) | Ratio of average diameter of nano-fibers to average particle diameter of inorganic particles | Ratio of diameter of a first fiber to outer diameter of a second fiber in a coaxial structure | Average particle diameter of inorganic particles (nm) | Average diameter of nano-fibers (nm) | Average pore diameter of porous layer (nm) | Depth of porous layer (μm) | Porosity of porous layer (%) | Penetration strength P of porous layer (%) (N/20 μm) | Self-discharge rate of battery (mV/h) | Ratio of 50$^{th}$-cycle discharge capacity to first-cycle discharge capacity |
|---|---|---|---|---|---|---|---|---|---|---|---|---|---|---|
| Comparative Embodiment 1 | — | — | | — | — | — | — | | — | 10 | 30% | 13.1 | 0.045 | 92.3% |
| Comparative Embodiment 2 | PVDF 99.9 | — | Acrylonitrile 0.09 | Boron trifluoride 0.01 | — | — | — | 100 | 400 | 10 | 75% | 6.4 | 0.059 | 93.5% |
| Embodiment 1 | PVDF 95 | Boehmite 4.9 | Acrylonitrile 0.09 | Boron trifluoride 0.01 | 1:5 | — | 500 | 100 | 200 | 10 | 75% | 16.6 | 0.025 | 95.9% |

TABLE 1-continued

| | Weight percent of nano-fibers (%) | Weight percent of inorganic particles (%) | Weight percent of cross-linker (%) | Weight percent of initiator (%) | Ratio of average diameter of nano-fibers to average particle diameter of inorganic particles | Ratio of diameter of a first fiber to outer diameter of a second fiber in a coaxial structure | Average particle diameter of inorganic particles (nm) | Average diameter of nano-fibers (nm) | Average pore diameter of porous layer (nm) | Depth of porous layer (μm) | Porosity of porous layer (%) | Penetration strength P of porous layer (%) (N/20 μm) | Self-discharge rate of battery (mV/h) | Ratio of 50$^{th}$-cycle discharge capacity to first-cycle discharge capacity |
|---|---|---|---|---|---|---|---|---|---|---|---|---|---|---|
| Embodiment 2 | PVDF 69.9 | Boehmite 30 | Acrylonitrile 0.09 | Boron trifluoride 0.01 | 1:5 | — | 500 | 100 | 200 | 10 | 75% | 21.3 | 0.021 | 96.4% |
| Embodiment 3 | PVDF 49.9 | Boehmite 50 | Acrylonitrile 0.09 | Boron trifluoride 0.01 | 1:5 | — | 500 | 100 | 200 | 10 | 75% | 21.6 | 0.022 | 96.3% |
| Embodiment 4 | PVDF 29.9 | Boehmite 70 | Acrylonitrile 0.09 | Boron trifluoride 0.01 | 1:5 | — | 500 | 100 | 200 | 10 | 75% | 20.1 | 0.022 | 96.2% |
| Embodiment 5 | PVDF 4.9 | Boehmite 95 | Acrylonitrile 0.09 | Boron trifluoride 0.01 | 1:5 | — | 500 | 100 | 200 | 10 | 75% | 18.2 | 0.024 | 96.0% |
| Embodiment 6 | PVDF 69 | Boehmite 30 | Acrylonitrile 0.9 | Boron trifluoride 0.1 | 1:5 | — | 500 | 100 | 200 | 10 | 75% | 23.4 | 0.019 | 96.4% |
| Embodiment 7 | PVDF 65 | Boehmite 30 | Acrylonitrile 4.5 | Boron trifluoride 0.5 | 1:5 | — | 500 | 100 | 200 | 10 | 75% | 25.0 | 0.016 | 96.3% |
| Embodiment 8 | PVDF 63 | Boehmite 30 | Acrylonitrile 6.3 | Boron trifluoride 0.7 | 1:5 | — | 500 | 100 | 200 | 10 | 75% | 25.5 | 0.016 | 96.0% |
| Embodiment 9 | PVDF-HFP 65 | Boehmite 30 | Acrylonitrile 4.5 | Boron trifluoride 0.5 | 1:5 | — | 500 | 100 | 200 | 10 | 75% | 22.4 | 0.018 | 95.1% |
| Embodiment 10 | PVDF 65 | ZrO$_2$ 30 | Acrylonitrile 4.5 | Boron trifluoride 0.5 | 1:5 | — | 500 | 100 | 200 | 10 | 75% | 26.6 | 0.016 | 95.9% |
| Embodiment 11 | PVDF 65 | Boehmite 30 | Triethylene glycol diacrylate 4.5 | Lauroyl peroxide 0.5 | 1:5 | — | 500 | 100 | 200 | 10 | 75% | 23.1 | 0.019 | 94.4% |
| Embodiment 12 | PVDF 65 | Boehmite 30 | Acrylonitrile 4.5 | Boron trifluoride 0.5 | 1:2 | — | 200 | 100 | 200 | 10 | 75% | 17.8 | 0.020 | 95.9% |
| Embodiment 13 | PVDF 65 | Boehmite 30 | Acrylonitrile 4.5 | Boron trifluoride 0.5 | 1:10 | — | 1000 | 100 | 200 | 10 | 75% | 27.5 | 0.014 | 96.6% |
| Embodiment 14 | PVDF 65 | Boehmite 30 | Acrylonitrile 4.5 | Boron trifluoride 0.5 | 1:200 | — | 10000 | 50 | 200 | 10 | 75% | 20.3 | 0.022 | 96.1% |
| Embodiment 15 | PVDF 65 | Boehmite 30 | Acrylonitrile 4.5 | Boron trifluoride 0.5 | 1:10 | — | 1000 | 100 | 1000 | 10 | 75% | 26.2 | 0.016 | 97.0% |
| Embodiment 16 | PVDF 65 | Boehmite 30 | Acrylonitrile 4.5 | Boron trifluoride 0.5 | 1:10 | — | 1000 | 100/5 | 200 | 10 | 75% | 28.3 | 0.013 | 96.5% |
| Embodiment 17 | PVDF 30 | Boehmite 30 | Acrylonitrile 36 | Boron trifluoride 4 | 1:10 | 0.6 | 1000 | 100 | 200 | 10 | 75% | 23.8 | 0.015 | 95.1% |

TABLE 1-continued

| | Weight percent of nano-fibers (%) | Weight percent of inorganic particles (%) | Weight percent of cross-linker (%) | Weight percent of initiator (%) | Ratio of average diameter of nano-fibers to average particle diameter of inorganic particles | Ratio of diameter of a first fiber to outer diameter of a second fiber in a coaxial structure | Average particle diameter of inorganic particles (nm) | Average diameter of nano-fibers (nm) | Average pore diameter of porous layer (nm) | Depth of porous layer | Porosity of porous layer (%) | Penetration strength P of porous layer (%) (N/20 µm) | Self-discharge rate of battery (mV/h) | Ratio of $50^{th}$-cycle discharge capacity to first-cycle discharge capacity |
|---|---|---|---|---|---|---|---|---|---|---|---|---|---|---|
| Embodiment 18 | PVDF 55 | Boehmite 30 | Acrylonitrile 13.5 | Boron trifluoride 1.5 | 1:10 | 0.85 | 1000 | 100 | 200 | 10 | 75% | 30.9 | 0.013 | 96.8% |
| Embodiment 19 | PVDF 67 | Boehmite 30 | Acrylonitrile 2.7 | Boron trifluoride 0.3 | 1:10 | 0.98 | 1000 | 100 | 200 | 10 | 75% | 19.6 | 0.016 | 96.5% |
| Embodiment 20 | PVDF 65 | Boehmite 30 | Acrylonitrile 4.5 | Boron trifluoride 0.5 | 1:50 | — | 5000 | 100 | 200 | 10 | 75% | 27.1 | 0.016 | 96.5% |
| Embodiment 21 | PVDF 65 | Boehmite 30 | Acrylonitrile 4.5 | Boron trifluoride 0.5 | 1:10 | — | 1000 | 100 | 800 | 10 | 75% | 25.4 | 0.023 | 97.3% |
| Embodiment 22 | PVDF 65 | Boehmite 30 | Acrylonitrile 4.5 | Boron trifluoride 0.5 | 1:10 | — | 1000 | 100 | 200 | 5 | 75% | 18.7 | 0.030 | 97.9% |
| Embodiment 23 | PVDF 65 | Boehmite 30 | Acrylonitrile 4.5 | Boron trifluoride 0.5 | 1:10 | — | 1000 | 100 | 200 | 10 | 90% | 16.3 | 0.029 | 97.7% |
| Embodiment 24 | PVDF 65 | Boehmite 30 | Acrylonitrile 4.5 | Boron trifluoride 0.5 | 1:10 | — | 1000 | 100 | 200 | 10 | 75% | 27.4 | 0.014 | 96.8% |
| Embodiment 25 | PVDF 65 | Boehmite 30 | Acrylonitrile 4.5 | Boron trifluoride 0.5 | 1:10 | — | 1000 | 100 | 200 | 10 | 75% | 32.0 | 0.013 | 96.1% |
| Embodiment 26 | PVDF 95 | Boehmite 4.9 | Acrylonitrile 0.09 | Boron trifluoride 0.01 | 1:5 | — | 500 | 100 | 200 | 10 | 75% | 16.3 | 0.030 | 95.8% |

As can be seen from Table 1, with the inorganic particles introduced into the nanofibrous porous substrate, the penetration strength of the porous layer is increased significantly, the self-discharge rate is reduced significantly, and the cycle performance of the lithium-ion battery is improved. Without being limited to any theory, the inventor of this application holds that the introduced inorganic particles increase the strength of the porous layer, and block the "macropores" that may exist in the nanofibrous porous substrate, thereby increasing the penetration strength of the porous layer, reducing the self-discharge rate, and improving the cycle performance of the lithium-ion battery. Due to the crosslinker introduced, the bonding strength is further increased between the nanofibers and between a nanofiber and an inorganic particle, thereby further increasing the penetration strength of the porous layer, further reducing the self-discharge rate, and further improving the cycle performance of the lithium-ion battery.

What is described above is merely preferred embodiments of this application, but is not intended to limit this application. Any modifications, equivalent substitutions, and improvements made without departing from the spirit and principles of this application still fall within the protection scope of this application.

What is claimed is:

1. An electrochemical device, comprising
an electrode plate; and
a porous layer on a surface of the electrode plate, wherein the porous layer comprises nanofibers and inorganic particles, the nanofibers and the inorganic particles are bonded together by a crosslinker, and a penetration strength P newtons (N)/20 µm of the porous layer and a percentage M of a mass of the inorganic particles in a total mass of the porous layer satisfy the following relational expression:

$$9 \le \frac{P}{M+1} \le 150.$$

2. The electrochemical device according to claim 1, wherein the porous layer further comprises an initiator, and based on a total mass of the porous layer, a weight percent of the nanofibers is 4.9 wt % to 95 wt %, a weight percent of the inorganic particles is 4.9 wt % to 95 wt %, a weight percent of the crosslinker plus the initiator is 0.1 wt % to 40 wt %, and a mass of the initiator is 5% to 20% of a total mass of the crosslinker and the initiator.

3. The electrochemical device according to claim 2, wherein the initiator is selected from the group consisting of benzoyl peroxide, tert-butyl benzoyl peroxide, methyl ethyl ketone peroxide, azobisisobutyronitrile, azobisisoheptanenitrile, dimethyl azobisisobutyrate, azobisisobutylamidine hydrochloride, boron trifluoride, phosphorus pentafluoride, titanium tetrachloride, tin tetrachloride and zinc dichloride.

4. The electrochemical device according to claim 2, wherein each of the nanofibers comprises a core layer and a shell layer, and the crosslinker and the initiator are comprised in the shell layer.

5. The electrochemical device according to claim 1, wherein $P \geq 16$.

6. The electrochemical device according to claim 1, wherein $P \geq 20$.

7. The electrochemical device according to claim 1, wherein the crosslinker is selected from the group consisting of polyisocyanate, hexamethoxymethylmelamine, N-methylol acrylamide, carbodi-imide, trimethylolpropane, aziridine, dicumyl peroxide, butyl acrylate, N,N'-methylene bisacrylamide, 2,5-dimethyl-2,5-bis(tert-butylperoxide) hexane, bisphenol A epoxy resin, an acrylate derivative, a nitrile-containing polymer, styrene, vinyl fluoride, acrylonitrile, acrylamide, vinyl acetate, alkyl vinyl ether, alkylene oxide, and a trimethylene oxide derivative.

8. The electrochemical device according to claim 1, wherein the nanofibers comprise a flat ribbon fiber, and a ratio of a length value at a widest position to a length value at a narrowest position of a cross-section of the flat ribbon fiber is 2 to 100.

9. The electrochemical device according to claim 8, wherein the ratio of the length value at a widest position to the length value at a narrowest position of a cross-section of the flat ribbon fiber is 5 to 20.

10. The electrochemical device according to claim 1, wherein the nanofibers are selected from the group consisting of polyvinylidene difluoride, polyimide, polyamide, polyacrylonitrile, polyethylene glycol, polyethylene oxide, polyphenylene ether, polypropylene carbonate, polymethyl methacrylate, polyethylene terephthalate, polyvinylidene difluoride-hexafluoropropylene, polyvinylidene difluoride-chlorotrifluoroethylene, and a derivative thereof.

11. The electrochemical device according to claim 1, wherein the porous layer is characterized by at least one of the following:

an air permeability of the porous layer is 5 s/100 cm³ to 400 s/100 cm³;

a porosity of the porous layer is 30% to 95%;

an average pore diameter of the porous layer is 20 nm to 10 µm;

a thickness of the porous layer is 1 µm to 20 µm;

pore diameters of the porous layer decrease linearly in a thickness direction from a region farther away from the electrode plate to a region closer to the electrode plate;

the pore diameters of the porous layer decrease nonlinearly in the thickness direction from the region farther away from the electrode plate to the region closer to the electrode plate; or the pore diameters of the porous layer decrease discontinuously in the thickness direction from the region farther away from the electrode plate to the region closer to the electrode plate.

12. The electrochemical device according to claim 1, wherein a number of the inorganic particles per unit area of the porous layer is $5 \times 10^7/m^2$ to $3 \times 10^{19}/m^2$.

13. The electrochemical device according to claim 1, wherein a mass of the inorganic particles per unit area of the porous layer is 0.004 g/m² to 60 g/m².

14. The electrochemical device according to claim 1, wherein an average particle diameter of the inorganic particles is 0.01 µm to 10 µm.

15. The electrochemical device according to claim 1, wherein the inorganic particles are selected from the group consisting of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$, boehmite, magnesium hydroxide, aluminum hydroxide, lithium phosphate, lithium titanium phosphate, lithium aluminum titanium phosphate, lithium lanthanum titanate, lithium germanium thiophosphate, lithium nitride, $SiS_2$ glass, $P_2S_5$ glass, $Li_2O$, LiF, LiOH, $Li_2CO_3$, $LiAlO_2$, $Li_2O$—$Al_2O_3$—$SiO_2$—$P_2O_5$—$TiO_2$—$GeO_2$ ceramic and garnet ceramic.

16. The electrochemical device according to claim 1, wherein the porous layer is prepared by air spinning, or centrifugal spinning.

17. An electronic device, comprising an electrochemical device, wherein the electrochemical device comprises an electrode plate and a porous layer formed on a surface of the electrode plate, wherein the porous layer comprises nanofibers and inorganic particles, the nanofibers and the inorganic particles are bonded together by a crosslinker, and a penetration strength P newtons (N)/20 µm of the porous layer and a percentage M of a mass of the inorganic particles in a total mass of the porous layer satisfy the following relational expression:

$$9 \leq \frac{P}{M+1} \leq 150.$$

18. The electronic device according to claim 17, wherein the porous layer further comprises an initiator, and based on a total mass of the porous layer, a weight percent of the nanofibers is 4.9 wt % to 95 wt %, a weight percent of inorganic particles is 4.9 wt % to 95 wt %, a weight percent of the crosslinker plus the initiator is 0.1 wt % to 40 wt %, and a mass of the initiator is 5% to 20% of a total mass of the crosslinker and the initiator.

* * * * *